United States Patent Office 2,952,542
Patented Sept. 13, 1960

2,952,542

PROTEIN COMPOSITIONS AND PROCESS OF PRODUCING THE SAME

Claude Giddey, Carouge, Geneva, Switzerland, assignor to F.P. Research Limited, Melton Mowbray, England, a British company No Drawing. Filed Mar. 4, 1958, Ser. No. 718,962

Claims priority, application Great Britain Mar. 14, 1957

24 Claims. (Cl. 99—14)

The present invention is concerned with protein compositions and their production, and has for one of its objects to provide an improved protein composition for use as foodstuffs for animals or human beings, for example as synthetic meat or meat-like food.

According to the present invention there is provided a protein composition comprising artificial fibers of which at least the predominant constituent is protein and a binder which comprises a complex of a binder protein with at least one polysaccharide having side groups which can react with the binder protein, said fibers being bonded together by said binder.

The side groups of the polysaccharide may be acidic in character. Since the reactivity to proteins of polysaccharides with acidic side groups increases with increase in the acidic character of these side groups, it is preferable for the side groups to be relatively strongly acid. Polysaccharides having sulphate side groups, of which carrageenins are commercially available examples, are suitable for carrying the invention into effect, but other reactive polysaccharides may be used.

Further according to the present invention there is provided a process for producing a protein composition comprising the steps of preparing a binder liquor by adding to an aqueous dispersion of a binder protein a polysaccharide having side groups which react with the binder protein, incorporating therewith artificial fibers of which at least the predominant constituent is protein, removing, after reaction between the binder protein and the polysaccharide has occurred, the liquid portion of said binder liquor while the fibers are incorporated therewith and forming a compact mass comprising the fibers and the solid portions of the binder liquor.

The fibers may be incorporated with the binder liquor by immersing the fibers therein. In this case, the aqueous dispersion of protein desirably contain from 50 to 300 g. per liter protein, but preferably 80 to 150 g. per liter. It is desirable for the ratio of fiber to binder in the resulting protein composition, to lie between 3:1 and 3:20 based on the dry weight, and preferably about 1:1. This corresponds to the dry weight of fibers used to the total dry weight of protein and polysaccharide contained in the volume of liquor in which the fibers are immersed. It is also preferable for the protein to be finely dispersed, and this is conveniently achieved by precipitating the protein from aqueous solution by adjusting the pH value of the solution to approximately that of the isoelectric point of the protein, usually from pH 4.5 to 5.5.

On the dispersed particles of protein is formed, by reaction with the polysaccharide, a protein-polysaccharide complex which can, when fibers are immersed in the binder liquor and after the removal of the liquid phase of the liquor, serve as a binder to bond the fibers into a compact mass.

If carrageenin is used as the polysaccharide, it may be added to the aqueous dispersion at concentrations of from 1 to 50 g. per liter, and, in the case of a refined, highly reactive carrageenin, preferably about 10 g. per liter. The concentration of carrageenin used should give a ratio by weight of binder protein to polysaccharide of from 10:3 to 100:1, and preferably from 10:1 to 20:1.

The binder liquor, which is a dispersion or slurry, may be used at any temperature from 20 to 100° C., the temperature influencing the reaction between the protein and the polysaccharide. An increase in temperature increases the extent of the reaction, and hence the binding properties of the complex. It is preferable to heat the aqueous dispersion gradually to about 80°, for example over a period of 20 minutes.

The fibers may be immersed in the liquor after the addition of the polysaccharide. The fibers need not be dry before immersion. When it is desired to heat the liquor, the liquor may be heated before the introduction of the fibers, and the fibers then immersed in the hot liquor. It is preferable, however, to immerse the fibers in the liquor before heating, and then to heat the liquor in the presence of the fibers.

When the reaction between protein and polysaccharide in the binder liquor has occurred, and the fibers are thoroughly soaked—these operations may be effected successively or simultaneously—the liquid phase of the slurry comprising the binder liquor is separated from the fibers and the solid part of the binder liquor, and the fibers and the said solid part are compressed together to form a compact mass which solidifies on cooling. The separation and the compression are conveniently carried out in one operation by centrifuging the binder liquor with the fibers immersed therein. A tube or unperforated basket centrifuge may be used for this operation.

When the mass has cooled the fibers are bonded together by the binder, forming a protein composition which may be cut into pieces as required.

The structure of the protein composition may be modified by subsequent heating in an aqueous medium, with or without salts, and in this way products of different hardness may be produced. The product may be sterilized, for example at temperatures above 100° C., and this operation may also serve to modify the texture of the material, for example by affecting chewiness in the case of a synthetic meat.

Flavoring and coloring matters may be incorporated in the protein composition, for example by adding them to the binder liquor before the elimination of the liquid phase. They may also be injected into the finished meat-like food.

Fibers suitable for use in the invention should consist predominantly of protein, and the type of fiber may be chosen to give a desired analysis or texture to the resulting protein composition. Suitable protein fibers may be obtained in conventional manner, or as described in our co-pending patent application S. N. 718,961, filed March 4, 1958.

Proteins suitable for use as binder proteins for the purposes of the present invention may be of animal or vegetable origin.

Since it is preferable to use a finely dispersed protein and this is conveniently obtained by precipitation of a dissolved protein, it is preferable for the protein to be readily soluble, for example under weakly alkaline aqueous conditions, and readily precipitated, for example by adjusting the pH value of the solution to a value approximately equal to the isoelectric point of the protein. Examples of such proteins are blood serum proteins, including albumin, and fibrin, gelatine, casein, zein, soya protein, peanut protein, edestin and cottonseed protein.

The following are examples of ways in which the invention may be carried into effect.

Example 1

One kilogram defatted peanut meal (containing about 50% protein) is stirred for 1½ hours at room temperature in 10 liters water, adjusted to pH 8.5 with sodium hydroxide. The solid matter is then removed by centrifuging at 500 g in a basket centrifuge with a nylon cloth. Ten parts of the clear extract so obtained are used to extract in a similar way one part of fresh defatted peanut meal, and after the second centrifuging a clear extract is obtained which contains about 100 g. per liter protein together with other soluble substances. The pH value of the extract is then adjusted by means of hydrochloric or lactic acid to the isoelectric point of the protein (which is pH 4.7 for ground-nut protein), the protein being precipitated and a slurry obtained containing about 100 g. per liter protein. 10 g. per liter powdered refined carrageenin, is then dispersed in the slurry. Protein fibers are then immersed in and soaked in this binder liquor, 100 g. wet fiber (moisture content about 70% in 500 g. liquor, and the mixture of slurry and fibers heated gradually in a water-bath or steam-jacket over a period of 20 minutes to a temperature of 80° C. The hot mixture is then centrifuged at 100 g in a non-perforated basket centrifuge until the solid and liquid phases are separated. The solid phase is cooled, and is then removed, the product being a meat-like food which can be cut into small pieces. It may be sterilized by heating at 100–120° C. for 20 minutes, the texture and chewiness being improved at the same time.

Example 2

A clear extract containing about 50 g. per liter peanut protein is prepared by extracting one part of defatted peanut meal with 10 parts of water at pH 8.5 and centrifuging as described in Example 1. The pH value of this extract is then adjusted to pH 4.7 with hydrochloric acid, and the precipitated protein separated as a 200-g. per liter slurry and washed in a yeast separator. The washed slurry was diluted to 100 g. per liter protein content, and 10 g. per liter Gelcarine MR stirred in. To this binder liquor are added protein fibers, and the mixture is heated, centrifuged and cooled as described in Example 1. The resulting product is a meat-like food of similar properties to that obtained by Example 1.

Example 3

A washed slurry containing about 200 g. per liter peanut protein is prepared as described in Example 2. 10 g. per liter Gelcarine MR 80 is stirred into the slurry, protein fibers are added, and the mixture is heated, centrifuged and cooled as described in Example 1.

Example 4

A washed slurry containing about 200 g. per liter peanut protein is prepared as described in Example 2. The slurry is diluted until it contains 30 g. per liter protein, and 10 g. per liter Gelcarine MR 80 is stirred in. To this binder liquor are added protein fibers, and the mixture is heated, centrifuged and cooled as described in Example 1.

Example 5

100 g. per liter isoelectric casein is dispersed in water, and the pH value adjusted to 8.5 by means of sodium hydroxide. When the protein has dissolved, the pH value is adjusted to 4.6 by means of hydrochloric acid, and to the slurry of precipitated protein so produced is added 10 g. per liter Gelcarine MR. Protein fibers are immersed in this binder liquor and the process is continued as described in Example 1.

Example 6

100 g. per liter isolated soya protein is used in place of casein in the process described in Example 3.

Example 7

100 g. per liter of a commercial mixture of blood serum proteins (containing fibrin, albumin and globulin) is used in place of casein in the process described in Example 3, the pH of the solution of protein being adjusted to 5.0 to precipitate the protein.

I claim:

1. A protein composition comprising artificial fibers of which at least the predominant constituent is protein and a binder which comprises a complex of a binder protein with at least one polysaccharide having side groups which can react with the binder protein, said fibers being bonded together by said binder.

2. A protein composition according to claim 1, wherein said side groups are acidic in character.

3. A protein composition according to claim 2, wherein the polysaccharide is a polysaccharide having sulphate side groups.

4. A protein composition according to claim 3, wherein the polysaccharide having sulphate side groups comprises a carrageenin.

5. A protein composition according to claim 1, wherein the ratio of the weight of fiber to the total weight of binder protein and polysaccharide is from 3:1 to 3:20.

6. A protein composition according to claim 5, wherein the ratio of the weight of fiber to the total weight of binder protein and polysaccharide is approximately 1:1.

7. A protein composition according to claim 1, wherein the binder protein comprises peanut protein.

8. A protein composition according to claim 1, wherein the binder protein comprises soya protein.

9. A protein composition according to claim 1, wherein the binder protein comprises casein.

10. A protein composition according to claim 1, wherein the binder protein comprises a protein derived from blood serum.

11. A process for producing a protein composition comprising the steps of preparing a binder liquor by adding to an aqueous dispersion of a binder protein a polysaccharide having side groups which react with the binder protein, incorporating therewith artificial fibers of which at least the predominant constituent is protein, removing after reaction between the binder protein and the polysaccharide has occurred the liquid portion of said binder liquor while the fibers are incorporated therewith, and forming a compact mass comprising the fibers and the solid portions of binder liquor.

12. A process according to claim 11 wherein the artificial fibers are incorporated with the binder liquor by immersing the fibers therein.

13. A process according to claim 11, wherein the ratio of the dry weight of fibers to the total dry weight of protein and polysaccharide contained in the volume of binder liquor with which the fibers are incorporated is from 3:1 to 3:20.

14. A process according to claim 13, wherein the ratio of the dry weight of fibers to the total by weight of protein and polysaccharide contained in the volume of binder liquor into which the fibers are incorporated is approximately 1:1.

15. A process according to claim 11, wherein said aqueous dispersion of a binder protein contains from 30 to 300 g. per liter protein.

16. A process according to claim 15, wherein the aqueous dispersion of a binder protein contains from 80 to 150 g. per liter protein.

17. A process according to claim 11, wherein said aqueous dispersion of binder protein is formed by precipitation of the protein from an aqueous solution of the protein by adjusting the pH value of the solution to a value approximately equal to the isoelectric point of the protein.

18. A process according to claim 11, wherein the said side groups are acidic in character.

19. A process according to claim 18, wherein the polysaccharide comprises a polysaccharide having sulphate side groups.

20. A process according to claim 19, wherein the polysaccharide comprises a carrageenin, and the concentration of polysaccharide in said binder liquor is from 1 to 50 g. per liter, the ratio by weight of binder protein to polysaccharide being from 10:3 to 100:1.

21. A process according to claim 20, wherein the concentration of polysaccharide in said liquor is 10 g. per liter.

22. A process according to claim 11, wherein the ratio by weight of binder protein to polysaccharide is from 10:1 to 20:1.

23. A process according to claim 11, wherein the temperature of said binder liquor is raised to a value not exceeding 100° C.

24. A process according to claim 23, wherein said binder liquor has a temperature of approximately 80° C. during at least part of the time in which the fibers are immersed therein.

References Cited in the file of this patent

UNITED STATES PATENTS

| | | |
|---|---|---|
| 2,682,466 | Boyer | June 29, 1954 |
| 2,830,902 | Anson | Apr. 15, 1958 |